March 21, 1950

R. W. POINTER 2,501,578

BRAKE MECHANISM

Filed Aug. 27, 1945

Robert W. Pointer
INVENTOR
BY
Harold D. Cook
ATTORNEY

March 21, 1950 R. W. POINTER 2,501,578
BRAKE MECHANISM
Filed Aug. 27, 1945 3 Sheets-Sheet 2

Robert W. Pointer
INVENTOR

BY Harold D. Cook
ATTORNEY

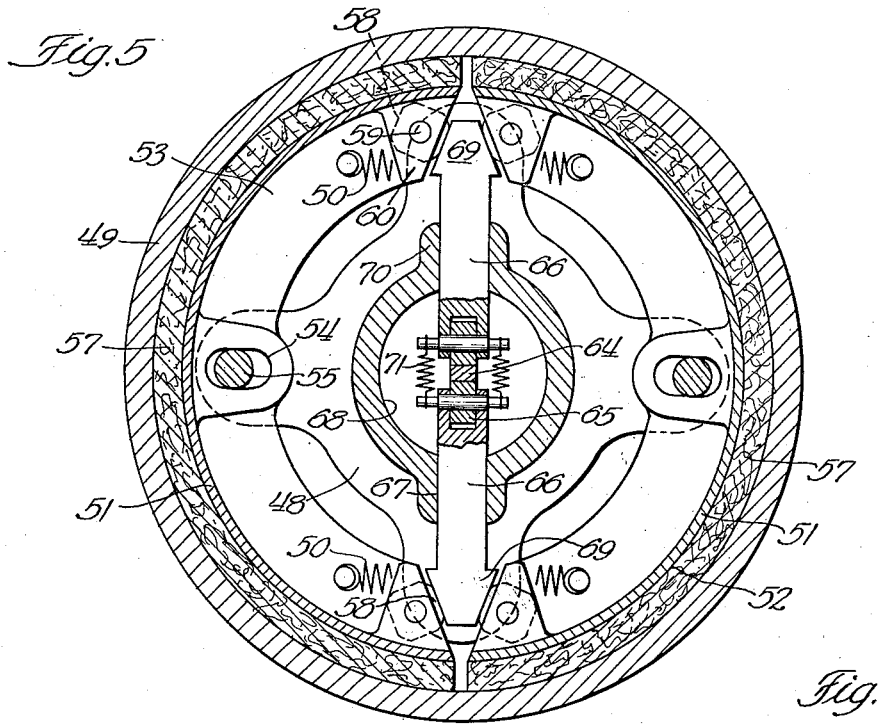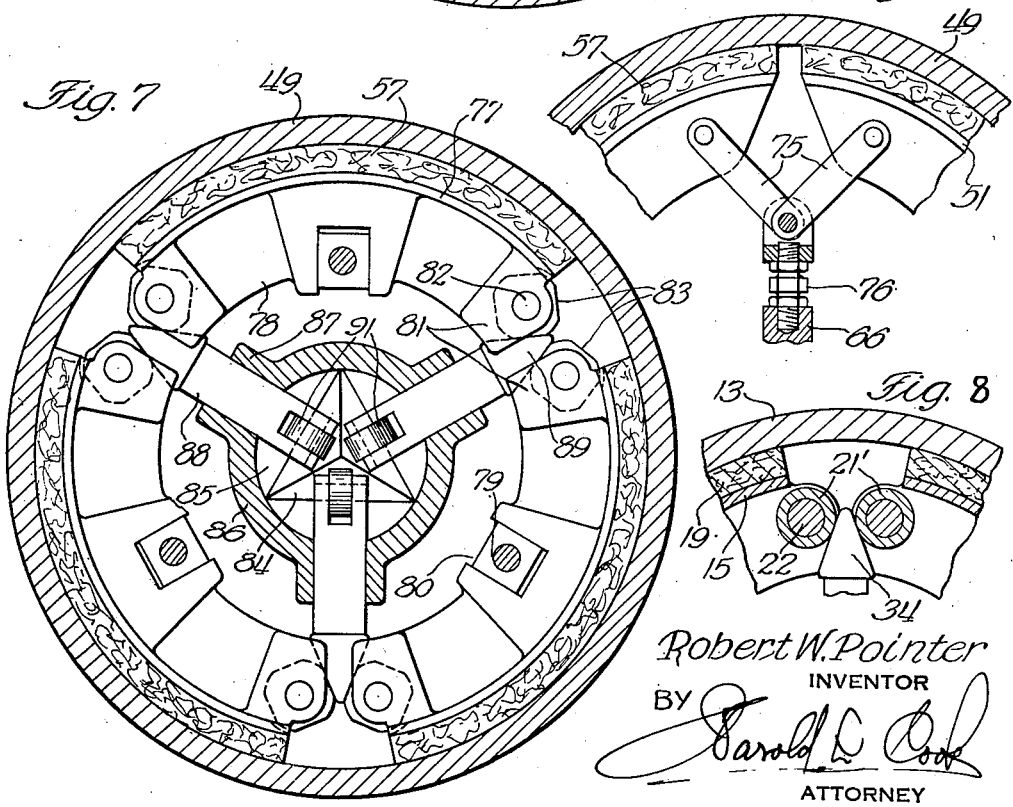

Patented Mar. 21, 1950

2,501,578

UNITED STATES PATENT OFFICE 2,501,578

BRAKE MECHANISM

Robert W. Pointer, Portland, Oreg.

Application August 27, 1945, Serial No. 612,741

10 Claims. (Cl. 188—152)

This invention relates to brake mechanisms, and has particular reference to a brake mechanism embodied in a removable axle spindle of novel construction.

The invention comprises a removable wheel spindle arranged for mounting on the end of an axle beam, and the present brake mechanism may be incorporated entirely in the removable spindle, or partly in the spindle and partly in the axle. The spindle is adapted to mount a vehicle wheel having a conventional brake drum for use with internal expanding brake shoes. Two or more such shoes are loosely mounted between integral flanges on the spindle by means of anchor blocks which serve primarily to restrain the shoes against rotation with the brake drum when the brakes are applied. An hydraulic wheel cylinder comprising a part of an hydraulic braking system is contained either within the wheel spindle or within the axle beam, the axle in the latter case being preferably of a tubular shape. Oppositely disposed wedges which engage slide blocks or rollers mounted in adjacent ends of the brake shoes are set in motion by movement of a piston or pistons in the wheel cylinder, outward movement of the wedges tending to move the brake shoes into engagement with the brake drum. The wedges apply equal pressure to each end of each brake shoe, the action of the wedges being to crowd the brake shoes against the brake drum with equal force for providing a braking surface equal to the total area of the brake linings.

The position of the wheel cylinder in the spindle or axle makes possible the mounting of pipe lines for the hydraulic fluid within the axle. On each vehicle a central master cylinder is connected to each of the wheel cylinders, and conventional air or vacuum installations requiring expensive adjusters, boosters and parts for mounting these devices are eliminated, an advantage of the invention being that such parts as are usually mounted on the axle are not necessary to the successful operation of the brake.

Brakes embodying the invention may be adapted for use with any type of tubular axle or beam by providing for mounting the removable spindle thereon. Likewise, the present brake may be employed on wheels mounted on single or dual axles, or on stub axles. When wheels are mounted on removable spindles the width of the track may be varied as desired by use of spacers mounted between flanges on the center section of the axle and the spindle. The removable spindles may be used with tube or beam sections of various lengths for accommodating the width of the wheel track to a particular type of vehicle. Intermediate the end flanges the axle is unencumbered by air chambers, vacuum boosters and other similar equipment conventionally mounted thereon, the mounting of spring suspensions, chain drives and other equipment being greatly facilitated by the absence of obstructing mechanisms usually attending the use of conventional brakes.

Assuming that the spindles are the most expensive part of an axle assembly, due to the necessity of machining and fitting operations, it follows that the center section of an axle adapted for mounting removable spindles is so relatively inexpensive as to make the use of oversized center sections of vehicle axles economically practicable. If this be done, the load carrying capacity of the vehicle may easily and economically be increased by increasing the spindle size. Moreover, the invention contemplates that in the event of a damaged axle assembly the axle may be repaired by substituting an assembly embodying the instant invention.

In a brake embodying the instant invention the brake shoes are self-centering, assuring equal pressure of the lining on the drum irrespective of the concentricity of the drum and the wheel bearing. Equal pressure on both ends of the shoes provides equal pressure throughout the area of the lining, insures that the shoes will be pressed against the drum with equal force, and that the brake lining will wear equally on both shoes. Proper equalizing adjustment is thereby automatically maintained. The wheel cylinder, being mounted remotely from the brake drum and brake shoes, is protected against heat deterioration. The structure provides for maximum braking area and produces equal brake efficiency wherein all the shoes are self-energizing in both forward and reverse directions.

The present construction eliminates the usual cam shaft and the close-tolerance machine work required in making the conventional actuating mechanism, the present parts in general being easier and more economical to manufacture. Although the actuating mechanism is entirely enclosed and protected, the spindle can easily be replaced in the field, if necessary, without shop equipment. Also, through the elimination of certain conventional mechanism, the brake shoes are made longer to provide a greater arc of contact between the lining and the drum while at the same time having improved characteristics in regard to uniformity of wear, uniformity of brake action in opposite directions of rotation, and automatic maintenance of adjustment, as hereinabove mentioned. Other advantages are increased strength in the spindle and brake shoes, reduced over-all weight, long life and ease of changing shoes, in comparison with conventional constructions.

The foregoing and other objects and advantages of the invention are obtained through the novel arrangement, unique construction, and improved combination of the various parts hereinafter described and as illustrated in the accompanying drawings, it being understood that various changes in form, proportion, size and details of construction within the scope of the claims may be resorted to without departing from the spirit or sacrificing any of the advantages of the invention.

In the drawings:

Figure 1 is a perspective view of the end portion of a vehicle axle and brake mechanism embodying the invention, parts thereof being broken away for sake of clarity of disclosure;

Figure 2 is a vertical longitudinal section through the end portion of a vehicle axle equipped with a brake mechanism embodying the invention;

Figure 5 is a transverse sectional elevation of the mechanism shown in Figure 4, taken substantially on the line 5—5 of Figure 4;

Figure 6 is a fragmentary detail showing a modification of the mechanism for transmitting motion from the wheel cylinder to the brake shoes;

Figure 7 is a transverse sectional elevation of a vehicle brake showing an embodiment of the invention in a structure employing three brake shoes; and Figure 8 is a fragmentary detail showing the use of rollers in the ends of the brake shoes engaging opposite faces of the actuating wedges.

Figure 3:
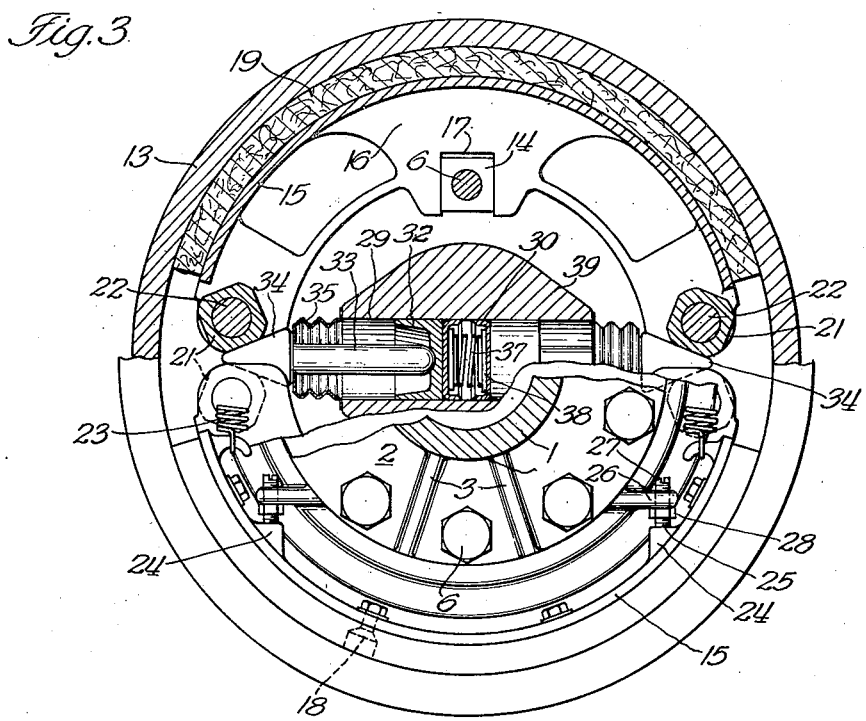
Figure 3 is a sectional view of the mechanism shown in Figure 2, taken substantially on the line 3—3 of Figure 2.

Referring to the drawings, the structure illustrated in Figures 1 to 3 comprises the end portion of a tubular axle 1 provided with an end flange 2 and a plurality of webs 3 extending between the flange and the axle for bracing the flange. A spindle 4 having an end flange 5 is mounted on the end of the axle 1, being secured thereto by means of cap screws 6. The spindle 4 constitutes an axial extension of the axle 1 and has mounted thereon the bearing cups 7 in which are mounted the bearings 8 which support the wheel hub 9 for rotation on the spindle. The spindle 4 is equipped with a flange 11 providing a bearing for the ends of certain ones of the cap screws 6, as hereinafter more particularly described. The flange 11 is parallel to and coextensive with the end flange 5 of the spindle 4 and is longitudinally spaced from the end flange 5 to provide for admitting the webbed portion of brake shoes between the flanges.

Fastened to the wheel hub as by means of stud bolts 12 is a brake drum 13 in the form of a cylindrical shell mounted concentrically with the spindle 4 and extending longitudinally of the shaft for a distance necessary to provide a drum engageable by a shoe having a web extending between the flanges 11 and 5 provided on the spindle 4.

Diametrically opposite cap screws 6 extend between the end flange 5 and the flange 11 of the spindle 4 for loosely supporting abutment blocks 14 having sides of equal dimensions so as to be substantially square in cross section. Mounted loosely on each abutment block 14 is an arcuately shaped brake shoe 15 having a web portion 16 received between the end flange 5 and the flange 11 of the spindle 4. Midway of the length of each brake shoe the web 16 is recessed at 17, the side walls of the recess loosely engaging the abutment block 14 by which the brake shoe is held against the forces created by rotation of the brake drum. Fastened to the outer face of the brake shoe 15 as by bolts 18 is a segment of brake lining 19 adapted to engage the inner surface of the brake drum 13 upon movement of the brake actuating mechanism into position to apply the brakes. In each end of each shoe a toe slide block 21 is mounted loosely on a transversely extending pin 22 journaled in spaced end portions of the web 16 of the brake shoe 15.

Provision is made for adjusting the position of the brake shoes 15 relative to the brake drum as the brake lining 19 becomes worn. Adjacent each end of each brake shoe 15 is an inwardly projecting boss 24 having a plane surface forming a shoulder 25. Extending tangentially from the end flange 5 of the spindle 4 are lugs 26, these lugs being so spaced on the end flange 5 as to overlie the shoulders 25 on the bosses 24. Each lug is provided with a tapped hole in which is threaded a set screw 27 having a jam nut 28 for holding the brake shoe 15 in predetermined position relative to the brake drum 13. As the brake lining 19 becomes worn, adjustment of the set screws 27 may be made to move the brake shoe 15 closer to the inner surface of the brake drum so as to provide for instantaneous action of the brake upon actuation of the brake applying mechanism. Such adjustment is obviously desirable when thick linings are used, to reduce the movement of the mechanism, but is not necessary for the purpose of keeping the brakes in operative condition as compensation for wear is effected automatically by the floating mounting each time the mechanism is actuated.

Intermediate the stud anchor flange 11 and end flange 5 the spindle 4 is provided with a transverse bore forming a wheel cylinder 29 having a piston 32 mounted in each end of the cylinder. Each piston 32 is provided with a rubber cup 30 on its pressure side, and carries a piston rod 33 having a wedge 34 mounted on the outer end thereof. A bellows seal 35 is provided between each piston rod and the cylinder. Hydraulic brake fluid is admitted through a pipe line 36 to the wheel cylinder 29 at a point intermediate the inner ends of the pistons 32, between the cups 30. As is usual in hydraulic brake systems, that portion of the wheel cylinder 29 between the inner ends of the pistons 32 is at all times filled with hydraulic brake fluid, as is also the pipe line 36 and other parts of the system. When pressure is applied to the fluid in the wheel cylinder 29 the pistons 32 are moved outwardly, causing the ends of the wedges 34 to enter between the toe slide blocks 21, thus moving the brake shoes 15 outwardly until the brake lining 19 is pressed against the inner surface of the brake drum 13. When the hydraulic brake fluid in wheel cylinder 29 is relieved of pressure, the brake shoes 15 are urged inwardly toward the spindle by action of the retracting springs 23, the blocks 21 sliding down the inclined faces of the wedges 34 and moving the pistons 32 inwardly of the wheel cylinder. A compression spring 37, bearing at each end against washers 38 in the cups 30, is positioned in the wheel cylinder 29 between the pistons 32 for preventing the pistons from being moved into position to cover the end of the pipe line 36, and to hold the wedges 34 snugly against the slide blocks 21.

The pipe 20 communicates with the highest point in the cylinder 29 and is connected with an external valve fitting in the axle housing for bleeding the air out of the system. This pipe is normally sealed off, performing no function in the operation of the brakes.

For providing a wheel cylinder 29 having sufficient length to guide the movement of the pistons 32, that portion 39 of the spindle 4 between the flange 11 and the end flange 5 is greatly thickened in the direction of the longitudinal axis of the wheel cylinder.

Figure 4:
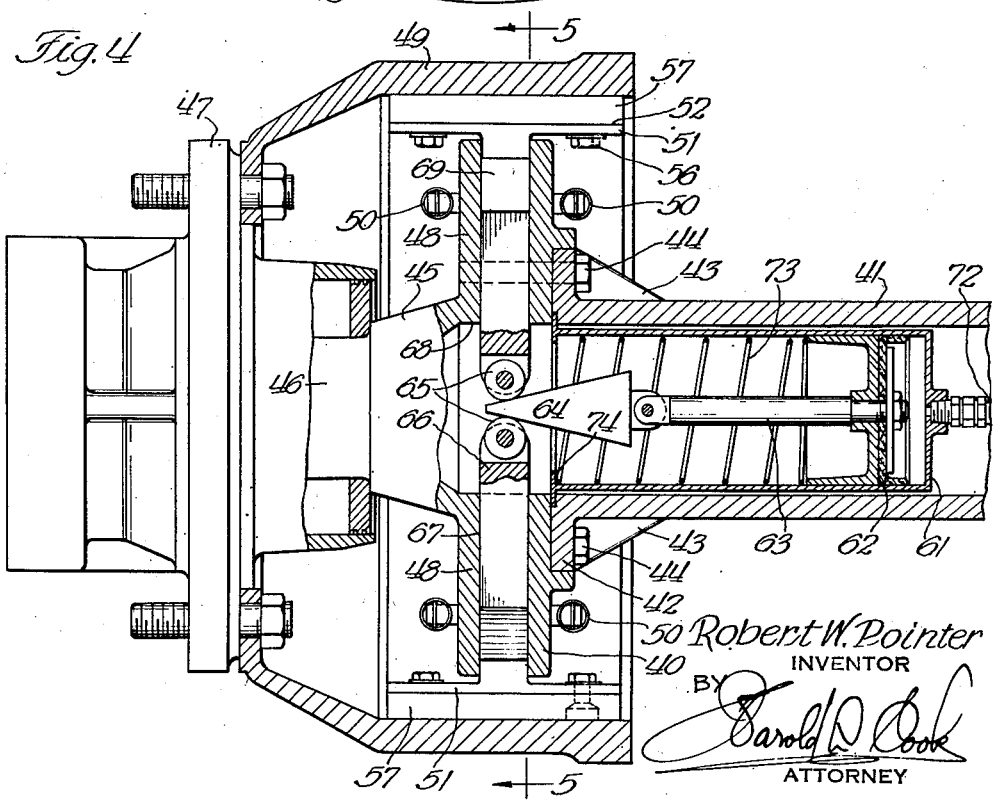
Figure 4 is a longitudinal sectional view through the end portion of a vehicle axle equipped with a brake mechanism embodying a modification of the structure shown in Figure 2.

Referring to Figures 4 and 5, there is shown the end portion of a vehicle axle 41 having an end flange 42. A plurality of radially disposed webs 43 extending between the end flange 42 and the axle 41 are provided for stiffening the flange. Removably mounted on the end flange 42 as by means of cap screws 44 is a spindle 45 having an end flange 40 and an extended wheel supporting section 46 on which is rotatably mounted a wheel hub 47. The spindle 45 is also provided with a flange 48 intermediate the end flange 40 and the wheel supporting section 46, the flange 48 being parallel to and coextensive with the end flange 40.

Fastened to the wheel hub 47 is a brake drum 49 comprising a generally cylindrical shell mounted concentric with the axle 41 and spindle 45 and extending longitudinally of the spindle. Mounted within the brake drum 49 are a pair of oppositely disposed brake shoes 51 having generally cylindrical outer surfaces 52 supported by webs 53 adapted to be received between the flange 48 and the end flange 40 of the spindle 45. Midway of its length, the web 53 of each brake shoe 51 is provided with a radially extending slot 54 adapted to receive an anchor pin 55 secured to the end flange 40. These anchor pins 55 provide means for holding the brake shoes 51 against the forces created by rotation of the brake drum 49. Fastened to the outer cylindrical surfaces of the brake shoes, as by rivets or bolts 56, are brake lining elements 57, each lining element being in the form of a segment of an annulus. The brake shoes 51 form substantially a complete cylinder, the ends of the brake shoes being substantially in abutment. In each end of each shoe a toe slide block 58 is mounted on a transversely extending pin 59 journaled in spaced lugs 60 forming the ends of the webs 53. A spring 50 is anchored to the adjacent ends of both shoes to hold the shoes against the brake applying mechanism hereinafter more particularly described.

Mounted in each end portion of the axle 41 is a wheel cylinder 61 in which is mounted a piston 62 having a piston rod 63 terminating in a wedge 64 adapted to engage between rollers 65 mounted in the inner ends of rods 66 slidably mounted in a cross bore 67 provided in the spindle 45 in line with the space between the flange 48 and the end flange 42. In order to provide a cross bore having sufficient length to guide movement of the rods 66, the spindle 45 is provided with bosses 70 which extend from opposite sides of the spindle in the direction of the longitudinal axis of the bore. For accommodating movement of the wedge 64 the spindle 45 is provided with an axially extending recess 68. The inner ends of rods 66 project into the recess at right angles to the longitudinal axis of the wedge 64, the rollers 65 being presented in closely spaced relation for engagement by the wedge 64. Upon movement of the wedge 64 into the recess 68 the rollers 65 have rolling engagement with the oppositely outwardly flaring surfaces of the wedge 64.

Mounted on the outer end of each of the rods 66 is a wedge shaped member 69, the rods 66 being of such length as to position the end of the wedge shaped member 69 between the rollers 58 in adjacent ends of the brake shoes 51.

The wheel cylinder 61 is supplied with hydraulic brake fluid through pipe line 72 which connects the wheel cylinder 61 with the master cylinder (not shown) of a hydraulic brake actuating mechanism. In the absence of pressure on the brake fluid, the piston 62 is held in its normally inactive position by means of a spring 73 mounted in the wheel cylinder and bearing at one end against the end wall 74 of the cylinder and at the other end against the piston 62. Upon the application of pressure to the fluid in the wheel cylinder 61, the spring 73 is compressed by outward movement of the piston 62, whereupon the wedge 64 enters between the rollers 65 and imparts outward movement to the rods 66 and wedges 69. When this movement occurs, the brake shoes 51 are moved outwardly against the action of the springs 50 and the brake lining 57 is pressed against the inner surface of the brake drum for applying braking action to the wheel. Upon release of pressure on the brake fluid in wheel cylinder 61, the springs 50 acting against the wedges 69 tend to return the brake shoes to the released position of the brake. At the same time, spring 73 in wheel cylinder 61 moves the piston 62 to its inactive position, whereupon wedge 64 is withdrawn from between rollers 65 permitting the springs 71 to move the wedge shaped members 69 to rest position.

In Figure 6 is shown a modification of the brake shoe actuating mechanism comprising toggle links 75 mounted on the outer ends of the rods 66 and connected to the adjacent ends of the respective brake shoes 51. In Figure 6 is also shown a means for adjusting the length of the rods 66 to compensate for wear of the brake lining 57. Such means may comprise a threaded connector 76 having left and right hand threads on the opposite ends thereof for engaging the threaded end portions of the rod 66 to vary the effective length thereof. Such a toggle arrangement may also be applied to the piston rods 33 in Figures 1 to 3 in lieu of wedges 34.

In Figure 7 is shown more or less diagrammatically the construction of a brake mechanism employing three brake shoes 77. Each of the brake shoes 77 comprises a web portion 78, the mid portion of each web 78 being slotted in the radial direction for the reception of an anchor pin 79 and abutment block 80, the anchor pin 79 being fastened to the end flange (not shown)

of the spindle. At each end of each shoe the web 78 is provided with spaced lugs 81 in which is journaled a transversely extending pin 82 comprising the shaft of a toe slide block 83 mounted in the end portion of the web between the lugs.

In Figure 7 the wedge 84 mounted on the end of the piston rod of the wheel cylinder (not shown) is disclosed as being triangular shaped, as a triangular pyramid, and having three working faces. The wheel cylinder (not shown) is mounted in the end portion of the vehicle axle in the manner shown in Figure 4, the piston rod extending longitudinally of the axle for positioning the wedge 84 for reciprocal movement relative to the recess 85 in the spindle 86. The spindle 86 is provided with bosses 87 which form bearings for radially extending rods 88 disposed at right angles to the longitudinal axis of the wedge 84. Mounted on the outer end of each rod 88 is a wedge 89 for engaging between the toe slide blocks 83 mounted in adjacent ends of the brake shoes and pressing the brake shoes 77 against the inner surface of the brake drum. Journaled in the inner end of each rod 88 is a roller 91 having rolling contact for engaging a working surface of the wedge 84. Upon movement of the wedge 84 into the recess 85 in the spindle 86, the wedge 84 engages between the rollers 91 for imparting outward movement to the rods 88. When this occurs, the wedges 89 on the outer ends of the rods 88 engage between the toe slide blocks 83 and press the brake shoes 77 against the brake drum to stop the vehicle. The toggle links shown in Figure 6 may be substituted for wedge 89 if desired.

Figure 8 shows an alternative construction employing rollers 21' instead of the slide blocks in the ends of the brake shoes. The other parts shown in Figure 8 are numbered consistently with Figures 1 to 3, the rollers 21' being merely substituted for the slides 21. The rollers 21' may also be substituted for the slide blocks 58 in Figure 5, and the slide blocks 83 in Figure 7, if desired. Slide blocks have an advantage over rollers in the ends of the brake shoes in that they bear against and slide upon the actuating wedges in surface to surface contact over a substantial area so as not to wear grooves in the wedges. The slide blocks are loosely mounted on their supporting pins for accommodating themselves to the angles of the working faces of the wedges, and may be rotated each time the brakes are relined to distribute the wear on all four sides of the blocks. It is preferred to use rollers only in brake mechanisms having sufficient movement of the wedges to distribute the wear on the wedges and rollers so that transverse grooves will not be worn in the faces of the wedges. This movement of the wedges refers to the change in position when the brakes are fully applied, arising from uncompensated wear of the brake lining, and not the movement to relaxed position. If the rollers drop into grooves an excessive force, perhaps beyond the capability of the system, may be necessary to produce any further movement of the wedges, and the brakes gradually will become less effective regardless of the force applied.

In each of the modifications of the invention herein described, each of the shoes is self-energized in both directions of rotation of the wheel. The brake operating mechanism is entirely enclosed, the end flange of the spindle providing the cover for preventing water, dirt or other foreign matter from entering the brake mechanism. In each of the modifications employed, proper adjustment of the brake shoes and equal application of pressure on the drum is had by reason of the fact that the wedges which engage between adjacent ends of the brake shoes move the brake shoes in opposite directions with equal force. If either of the brake shoes should be closer to the brake drum than the other and so be caused to engage the internal surface of the drum ahead of the other shoe, as soon as the one brake shoe has engaged the surface of the drum a greater force is applied to move the opposite shoe into contact with the drum, whereupon the shoes are pressed against the surface of the drum with equal force. That is to say that in each case the brake shoes are floatingly mounted so as to move into substantially full contact with the brake drum to apply uniform braking force over the entire area of the brake linings when the brakes are actuated. This self-centering action results from the brake shoes being freely movable in a radial direction and at the same time rockable to a certain extent about the anchor pins to conform to the interior braking surface of the drums. With this arrangement it is possible to completely wear out the lining without mechanical adjustment from time to time to compensate for wear. As wear occurs in the lining and drum the operating mechanism still invariably applies equal pressures on the several shoes regardless of their travel to engage the drum.

The above described action is further assured by the floating nature of the various wedges whereby they exert equal reaction forces against the particular members they are designed to move. No rigid guide means are provided for the outer ends of the piston rods or push rods so that the wedges carried thereby will have sufficient lateral freedom so as to be automatically self-centering with respect to the parts engaged thereby. In other words, the members to be moved themselves guide the wedges so that the forces exerted by the opposite faces are always balanced. This is true of the wedges on the radial piston rods in Figures 1 to 3, and it is also true of the wedges on both the radial push rods and axial piston rods in Figures 4, 5 and 7. The toggle arrangement of Figure 6 likewise inherently produces balanced forces on adjacent brake shoes.

Even in eccentrically worn brake drums the shoes and the wedges have sufficient freedom radially in all directions to move as a unit in an eccentric orbit without varying the braking pressure as the drum revolves. It is a well known fact that brake drums sometimes exhibit a tendency to wear eccentrically and that conventional brakes operate unsatisfactorily after such wear has occurred, alternately binding and releasing the drum as the so-called high and low spots rotate around the various fixed abutments engaged by the brake shoes. Within the limits of ordinary wear the present brake mechanism operates just as smoothly in eccentric drums as in perfectly true drums.

Having now described my invention and in what manner the same may be used, what I claim as new and desire to protect by Letters Patent is:

1. A vehicle axle comprising an end flange, a demountable spindle for said axle having an end flange, means detachably securing said flanges together for mounting said spindle on said axle, a brake mechanism mounted on said spindle comprising brake shoes each having a substantially cylindrical external surface, anchor pins extending through said flanges supporting said brake shoes for radial and rocking movements relative to said spindle, adjacent ends of said shoes being disposed in contiguous relation in one position of said shoes, self-centering wedging means engageable between said ends for moving said shoes into brake-applying position, and power means for moving said wedging means into position between said shoe ends.

2. In a brake mechanism for use on an axle having an end flange, an axle spindle, means for mounting a wheel and brake drum assembly on said spindle, an end flange on said spindle for mounting on said axle end flange, a plurality of securing means for uniting said two flanges, a second flange on said spindle spaced from said first flange, a plurality of brake shoes carried by certain of said securing means between said spindle flanges, and a power cylinder disposed transversely within said spindle and having oppositely directed radial piston rods movable outwardly to force said brake shoes apart and into engagement with said brake drum.

3. A brake mechanism comprising an axle spindle, a pair of spaced integral flanges on said spindle one of said flanges constituting a mounting flange for mounting the spindle on an axle, a plurality of brake shoes floatingly mounted between said flanges for sliding and rocking movements, a plurality of radial push rods carried by said spindle and directed between adjacent ends of said brake shoes in self-centering relation therewith, means on said push rods for forcing said brake shoes apart when said rods are extended, and a power cylinder mounted centrally with respect to said spindle to extend said push rods to actuate said brake mechanism.

4. A brake mechanism comprising an axle and spindle assembly having a hollow axle construction, a brake drum mounted for rotation on said spindle, a flange on said spindle attached to said hollow axle construction, anchor pins carried by said flange, brake shoes floatingly carried by said anchor pins, said brake shoes having free radial and rocking movements on said anchor pins to conform with the braking surface of said drum, said brake shoes being closely spaced end to end around said drum so as to engage substantially the entire circumference thereof, a plurality of radial push rods arranged to force the ends of said shoes apart to move all of said shoes into engagement with said drum to exert a braking action thereon, a fluid cylinder within said hollow axle, and a piston in said cylinder operable simultaneously to extend said push rods to produce said braking action.

5. A brake mechanism comprising an axle and spindle assembly having a hollow axle construction, a brake drum mounted for rotation on said spindle, a flange on said spindle attached to said hollow axle construction, anchor pins carried by said flange, brake shoes floatingly carried by said anchor pins, said brake shoes having free radial and rocking movements on said anchor pins to conform with the braking surface of said drum, said brake shoes being closely spaced end to end around said drum so as to engage substantially the entire circumference thereof, a plurality of radial push rods arranged to force the ends of said shoes apart to move all of said shoes into engagement with said drum to exert a braking action thereon, a fluid cylinder within said hollow axle, and a piston in said cylinder movable longitudinally of said axle and arranged to cam said push rods into extended position to actuate said brake shoes.

6. A brake mechanism comprising an axle spindle having a mounting flange, a flange on said spindle spaced from said mounting flange, a pair of anchor pins extending through said flanges, a brake shoe loosely mounted at approximately its mid-point on each of said anchor pins for sliding and rocking movements, a transverse power cylinder within said spindle, pistons in the opposite ends of said cylinder, pistons rods on said pistons extending in opposite radial directions between said brake shoes, and self-centering means operable by the extension of said piston rods to force the ends of said brake shoes apart to expand the braking surface.

7. In a brake mechanism, a hollow axle and spindle assembly, a flange on said axle, a pair of spaced integral flanges on said spindle, one of said flanges constituting a mounting flange, means for securing the mounting flange of said spindle to said axle flange, certain of said securing means extending between the flanges of said spindle to constitute brake shoe anchor pins, a plurality of brake shoes confined between said spindle flanges, each shoe having sliding and rocking movements on one of said anchor pins, self-centering means disposed between the ends of adjacent shoes for spreading said shoes, and a fluid pressure cylinder housed within said hollow assembly and having piston means operatively connected with said spreading means.

8. In a brake mechanism, a hollow axle and spindle assembly, a flange on said axle, a pair of spaced integral flanges on said spindle, one of said flanges constituting a mounting flange, means for securing the mounting flange of said spindle to said axle flange, certain of said securing means extending between the flanges of said spindle to constitute brake shoe anchor pins, rocking abutment blocks on said anchor pins between said spindle flanges, a plurality of brake shoes confined between said spindle flanges, each shoe having sliding engagement with one of said abutment blocks for sliding and rocking movements, self-centering wedges disposed between the ends of adjacent shoes for spreading said shoes, and a fluid pressure cylinder housed within said hollow assembly and having piston means operatively connected with said wedges.

9. In a brake mechanism, a spindle having a mounting flange, a second flange integral with said spindle and spaced from said mounting flange, abutment blocks between said flanges, a plurality of brake shoes confined between said flanges, each shoe having sliding engagement with one of said abutment blocks for sliding and rocking movements, self-centering means disposed between the ends of adjacent shoes for spreading said shoes, a transverse fluid pressure cylinder contained within said spindle, and pistons in said cylinder operatively connected with said spreading means.

10. In a brake mechanism, a hollow spindle having a mounting flange, a second flange integral with said spindle and spaced from said mounting flange, mounting means for said spindle, certain of said means constituting brake shoe anchor pins extending through said flanges, rocking abutment blocks on said anchor pins between said flanges, a plurality of brake shoes confined between said flanges, each shoe having sliding engagement with one of said abutment blocks for sliding and rocking movements, self-centering wedges disposed between the ends of adjacent shoes for spreading said shoes, a transverse fluid pressure cylinder contained within said hollow spindle, and pistons in said cylinder operatively connected with said wedges.

ROBERT W. POINTER.

REFERENCES CITED

The following references are of record in the file of this patent:

UNITED STATES PATENTS

| Number | Name | Date |
|---|---|---|
| 748,016 | Roberts | Dec. 29, 1903 |
| 1,022,506 | Rolland et al. | Apr. 9, 1912 |
| 1,475,781 | Batterman | Nov. 27, 1923 |
| 1,655,131 | Brown | Jan. 3, 1928 |
| 1,705,855 | Dodge | Mar. 19, 1929 |
| 1,870,289 | Johnson | Aug. 9, 1932 |
| 1,967,403 | Goepfrich | July 24, 1934 |
| 2,001,933 | McCann | May 21, 1935 |
| 2,158,818 | Franchi | May 16, 1939 |
| 2,184,050 | Miller | Dec. 19, 1939 |
| 2,213,383 | Canfield | Sept. 3, 1940 |
| 2,296,673 | Hunyady | Sept. 22, 1942 |

FOREIGN PATENTS

| Number | Country | Date |
|---|---|---|
| 550,131 | France | Dec. 6, 1922 |